(12) United States Patent
Grasselli

(10) Patent No.: US 7,658,135 B2
(45) Date of Patent: Feb. 9, 2010

(54) MEAT SLICING MACHINE

(76) Inventor: Giorgio Grasselli, 2 Via Roversi, Albinea, Reggio Emilia (IT) 142020

( * ) Notice: Subject to any disclaimer, the term of this patent is extended or adjusted under 35 U.S.C. 154(b) by 293 days.

(21) Appl. No.: 11/493,743

(22) Filed: Jul. 27, 2006

(65) Prior Publication Data

US 2007/0028740 A1 Feb. 8, 2007

(30) Foreign Application Priority Data

Aug. 3, 2005 (IT) .......................... RE2005A0097

(51) Int. Cl.
*B26D 7/06* (2006.01)
*B26D 1/46* (2006.01)
(52) U.S. Cl. ..................... 83/707; 83/713; 83/809; 83/932
(58) Field of Classification Search ................ 83/703, 83/707, 713, 719, 730, 788, 794, 809, 813, 83/409.2, 932
See application file for complete search history.

(56) References Cited

U.S. PATENT DOCUMENTS

| 2,850,055 | A | * | 9/1958 | Lasar ........................ 269/309 |
| 4,050,339 | A | * | 9/1977 | Soleri ........................ 83/703 |
| 4,436,012 | A | * | 3/1984 | Hochanadel ................ 83/703 |
| 4,960,025 | A | * | 10/1990 | Fitch ........................... 83/703 |
| 5,041,056 | A | * | 8/1991 | Hutton ...................... 452/171 |
| 5,163,865 | A | | 11/1992 | Smith |
| 5,241,885 | A | | 9/1993 | Kuchler |
| 5,458,055 | A | * | 10/1995 | Fitch, Jr. .................... 83/703 |
| 7,089,840 | B2 | * | 8/2006 | Freudinger et al. ........... 83/703 |

FOREIGN PATENT DOCUMENTS

| DE | 10124118 A1 | 12/2002 |
| EP | 0395437 A | 10/1990 |
| EP | 1252989 A | 10/2002 |
| FR | 2601280 A | 1/1988 |
| GB | 1209457 A | 10/1970 |
| GB | 2049550 | * 12/1980 |

* cited by examiner

*Primary Examiner*—Stephen Choi
(74) *Attorney, Agent, or Firm*—Browdy & Neimark, PLLC

(57) ABSTRACT

Meat slicing machine, comprising a belt blade (5) conceived to follow a straight cutting line (50) for the meat to be sliced, characterised in that it comprises a support surface (9) parallel to the cutting line (50) and set at a distance from the line at right angles to the support surface (9) itself; a container (11) for the meat to be sliced, having an exit opening (12) facing the said support surface (9) on the side of the cutting line (50); Pushing devices (13) associated with said container (11), conceived to push the meat down towards said exit opening (12); and a moving mechanism (19, 22) conceived to translate the container (11) in a parallel manner to the support surface (9) with a backward and forward motion from one side of the cutting line (50) to the other.

16 Claims, 4 Drawing Sheets

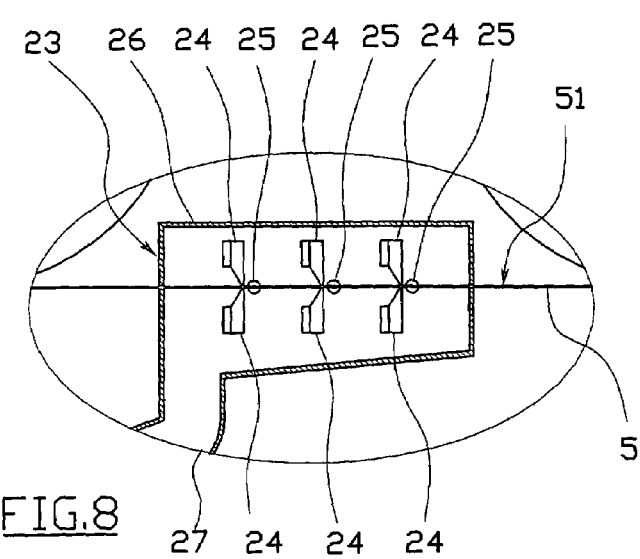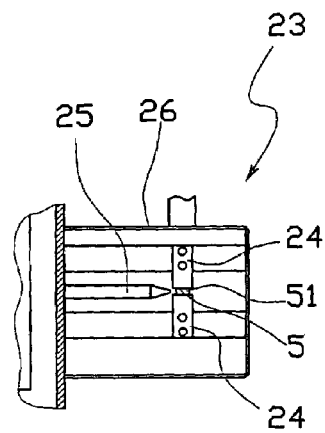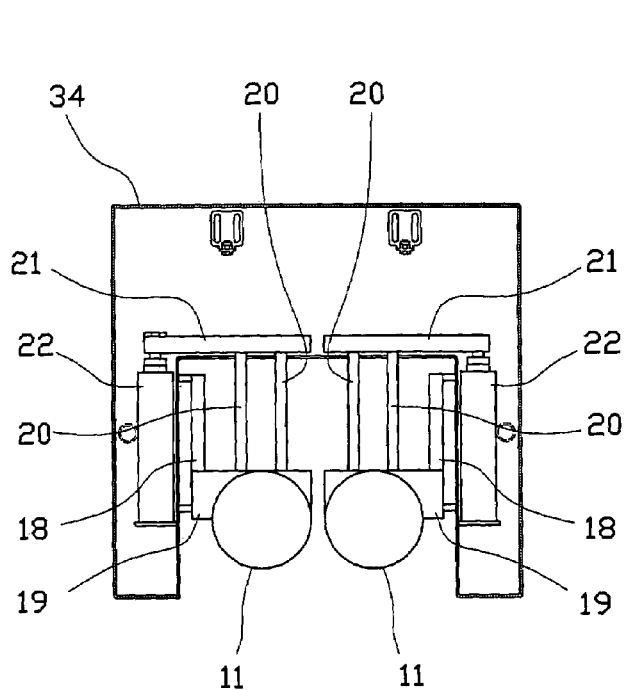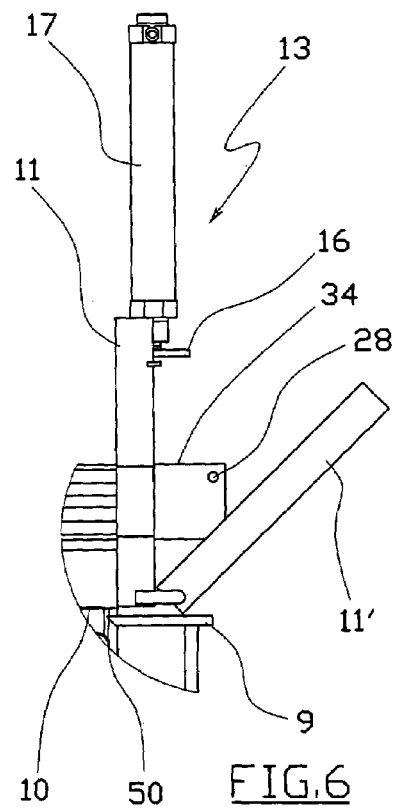

MEAT SLICING MACHINE

BACKGROUND OF THE INVENTION

The present invention relates to a machine for slicing meat, in particular meat on the bone.

Machines currently available on the market are generally composed of a flat horizontal support surface for placing the meat to be sliced, and a belt blade mounted around two transmission rollers, the blade then performing a straight line cutting action in an upward vertical direction from said support surface.

This machine is operated by placing the meat to be sliced on the support surface, then by pushing the meat in a suitable direction against the blade during the slicing action, to obtain the meat slices with the thickness required.

From this description it is obvious that these machines are very dangerous for the operator, who because of lack of attention or by accident can place their hands in direct contact with the blade causing serious injury.

In particular, this danger is increased even further due to the fact that often the meat to be sliced is frozen, and for this reason is slippery and can escape the operator's grasp.

BRIEF SUMMARY OF THE INVENTION

The aim of the present invention is to overcome the aforesaid problems by providing a simple, rational, and economical solution.

This aim is achieved by the invention by means of a meat-slicing machine as will be described below.

Said machine comprises: a support or surface parallel to the slicing action path, and set at a distance from the latter in a direction at right angles to the support surface; at least one container for the meat to be sliced, having an exit opening facing onto said support surface set on the slicing side; pusher means associated to said container, adapted to push the meat down towards said exit opening; and a moving mechanism conceived to slide the container in a direction parallel to the support surface, in an alternating motion backwards and forwards across the slicer area.

Thanks to this solution, the subject machine allows to slice the meat efficiently without the need for direct intervention by the operator during slicing action.

BRIEF DESCRIPTION OF THE DRAWINGS

Further characteristics and advantages will be made clearer in the following description provided simply as a non-limiting example, with the help of the figures illustrated in the appended drawings wherein:

FIG. 5 is the section V-V of FIG. 1;

FIG. 6 is an enlarged detail of FIG. 2, shown during meat loading action on the machine;

FIG. 7 is an enlarged detail of FIG. 2;

FIG. 8 is a front view of the detail of FIG. 7.

DETAILED DESCRIPTION OF THE INVENTION

The machine identified throughout in all appended figures by numeral 1, is a machine for slicing meat, in particular meat on the bone, whether fresh or deep-frozen.

Machine 1 comprises a casing provided with a set of support feet 2 to be placed on the floor, which also provides a main body 3 to support all the mechanical organs that perform the slicing action, and a secondary body 4 which contains all the command and control instruments for said mechanical organs.

Figure 1:
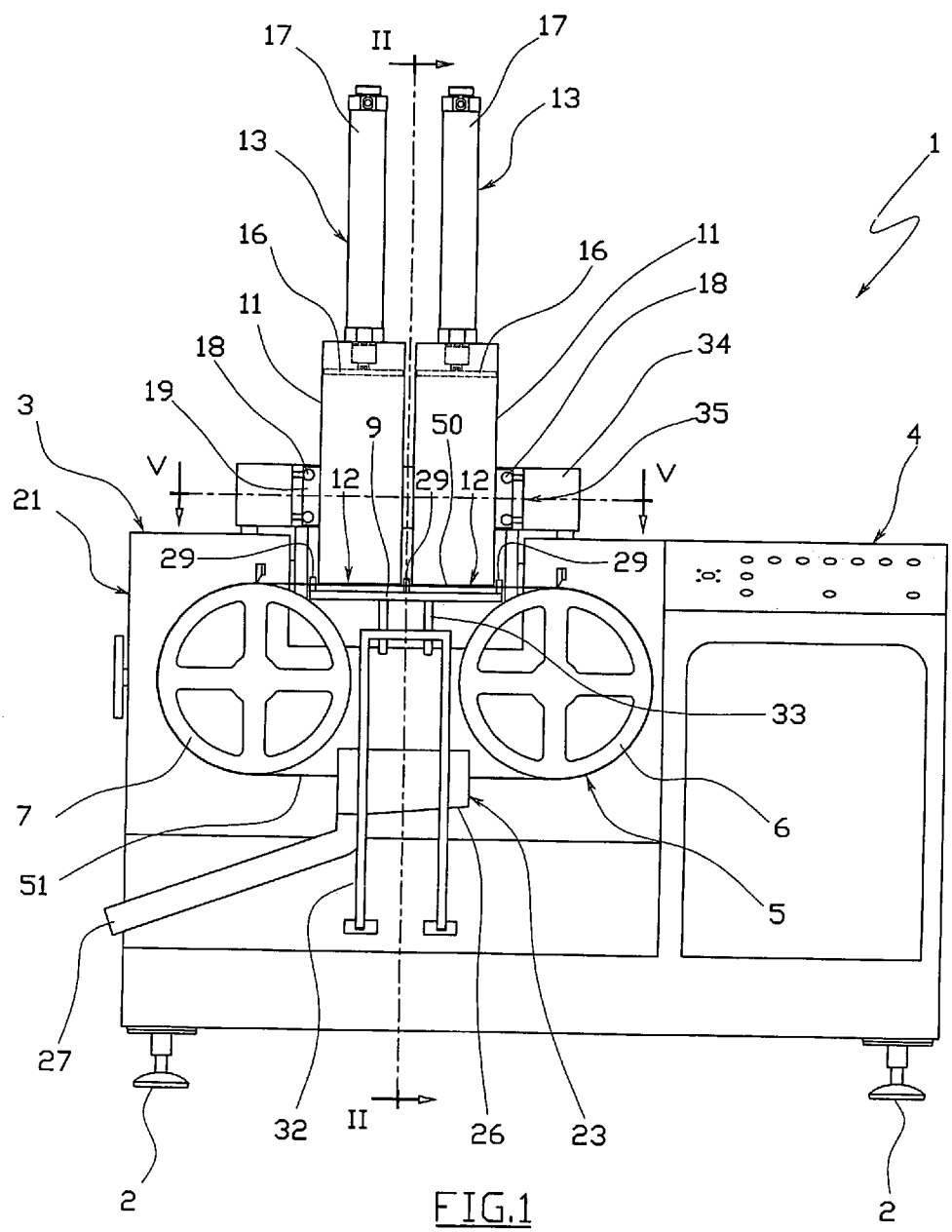
FIG. 1 is a front view of a meat slicing machine according to the invention, but without the front protection guard.
Figure 2:
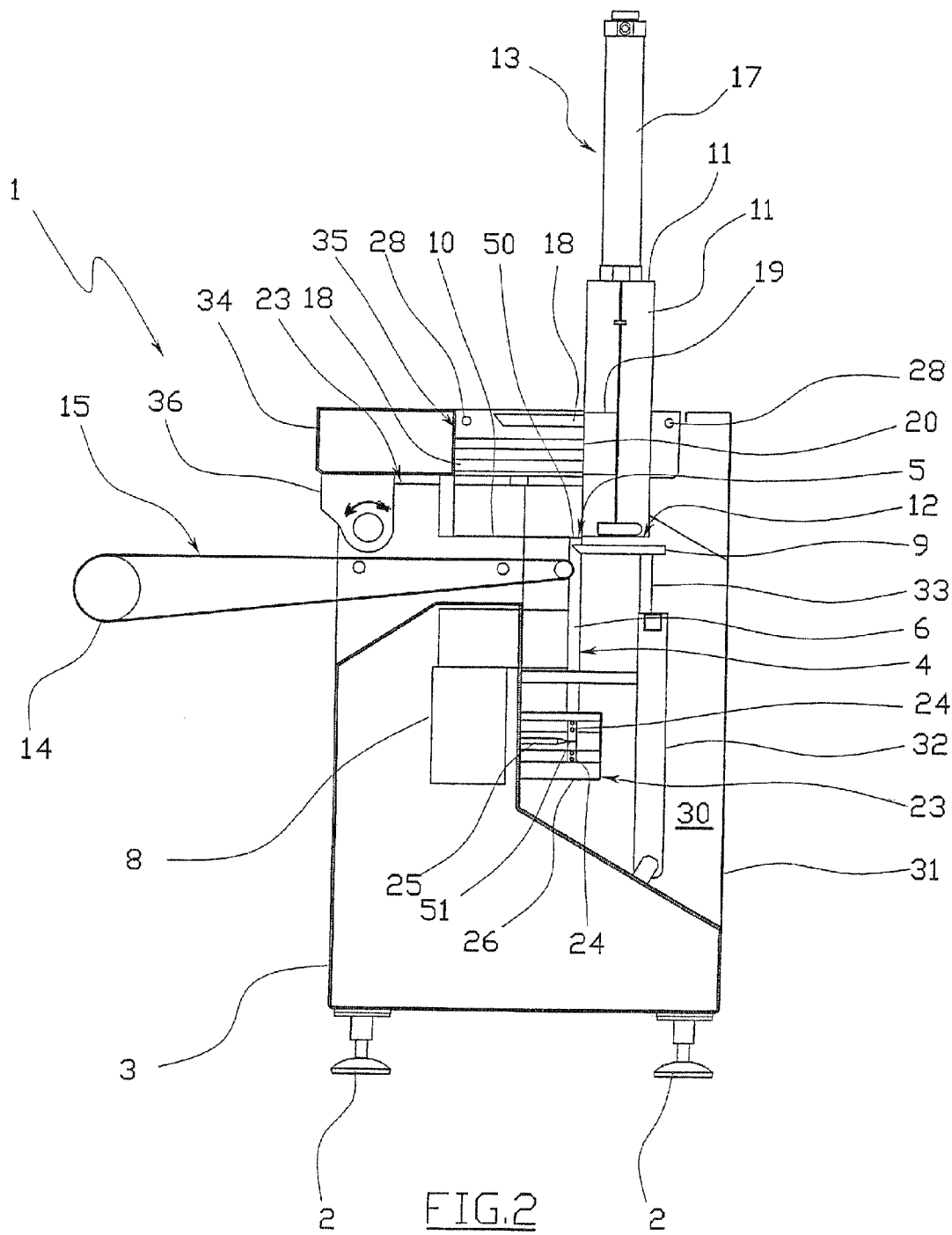
FIG. 2 is the section II-II of FIG. 1, with the front guard mounted in position.

As shown in FIG. 2, the main body 3 comprises a front compartment 30, normally closed by a flip-down guard 31, which contains a belt driven blade 5 running in ring fashion on two transmission rollers 6 and 7, to form a cutting line 50, in a horizontal straight line, set at a fixed height in relation to the flooring (Also refer to FIG. 1).

In particular, the transmission roller 6 is driven by a motor 8 housed inside the main body 3, while the transmission roller 7 is idle, and can be moved towards or away from the other roller, to adjust the tension of the belt blade 5.

Associated with the belt blade 5, are at least two horizontal surfaces for positioning the meat to be sliced, of which the front mobile surface 9, is set at a lower height than the cutting line 50, and the rear fixed surface 10, is adjacent and at the same height as the cutting line 50.

Figure 4:
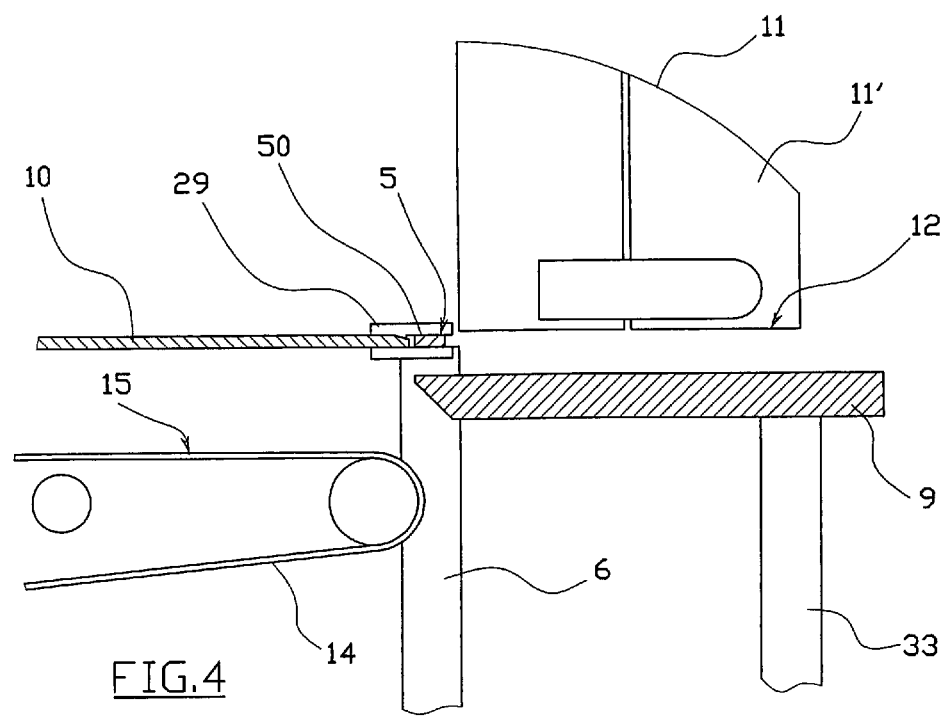
FIG. 4 is an enlarged detail of FIG. 2.

In particular, the front surface 9 is partially positioned between the said transmission rollers 6 and 7, so that the rear edge of the surface is vertically aligned under the cutting line 50 (refer to FIG. 4). The surface is also supported by an upright column 32 by means of shims 33 which are used to move it up and down to vary the height from the floor, and therefore from the cutting line 50.

As shown in FIG. 2, above said front 9 and rear surfaces 10, machine 1 comprises at least one container 11 for the meat to be sliced, having a lower exit opening 12, set slightly higher than the cutting line 50 of the belt blade 5 (refer also to FIG. 4).

Said container 11 is equipped with pusher means 13 adapted to push the meat inside the container so that it slides towards said exit opening 12 and it is associated to means for horizontal travel from one side of the cutting line 50 to the other, between a forward position where the exit opening 12 is facing downwards onto to the front support surface 9, and a rear position where it is facing downwards onto the support surface 10.

Under said rear support surface 10, machine 1 also comprises a conveyor belt 14, which provides a retractable plate, or upper moving surface, 15 adapted to transfer the slices of cut meat towards appropriate collection means (not shown) positioned at the rear of the machine 1.

In the example illustrated in the appended figures, machine 1 is equipped in particular with two containers 11, having a vertical tubular configuration, each one being divided lengthwise into two separate portions, reciprocally hinged at the exit opening 12, so that the front portion 11' can be flipped open forwards to permit meat loading for slicing (see FIG. 6).

Each container 11 is associated to a respective front support surface 9; therefore, machine 1 is globally provided with two surfaces 9 which can be individually adjusted in height independently from one another.

The pusher means 13 in each tubular container comprise a disk 16, which slides in a lengthwise direction inside the tubular container 11, driven by a jack 17 attached to the end opposite the exit opening 12.

Figure 3:
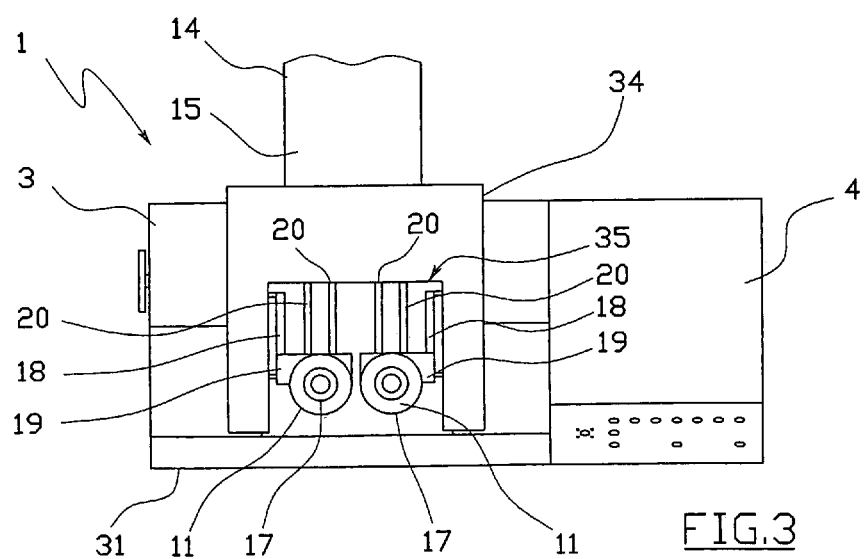
FIG. 3 is the plan view of the machine in FIG. 1.

As can be seen in FIG. 3, both tubular containers 11 are held by the same support frame 34 which is positioned to rest on the main body 3, and has a substantially C-shaped configuration in plan view, in a manner so to provide two side arms adapted to define a corridor 35 inside which the tubular containers 11 are able to slide.

In particular, each single side arm bears two guide rails 18 which protrude inside said translation/slide corridor (also refer to FIG. 1), to which a mobile carriage 19 is slidingly coupled, to which a respective tubular container 11 is solidly attached; said mobile carriage 19 being driven by a pair of sliding rods 20 which protrude from the support frame 34, the internal end of which is connected by means of a common crossbar 21, to a driving jack 22. (See FIG. 5).

It should be observed that, as shown in FIG. 2, the support frame 34 is also adapted to support the aforesaid rear support surface 10, and is equipped with two brackets 36, hinged to the main body 3, so that it can be flipped back to a rest position, making the slicing area accessible in order to facilitate cleaning of the front support surface 9 and the tubular containers 11.

The machine 1 also comprises a safety system adapted to arrest the translation action of the tubular containers 11, in the case where any object, such as the operators' hand, accidentally enters the interior of the translation corridor 35 of the support frame 34.

As shown in FIG. 2, in particular, said safety system comprises two photocells 28, positioned respectively in the front and rear part of said translation corridor 35, which are adapted to identify the presence of any object, and to transmit an electric signal to the control devices which arrest the machine 1 operation.

Lastly, the machine 1 comprises a cleaning system 23 for the belt blade 5, which system is adapted to run on the lower straight line section 51 as it runs around the transmission rollers, 6 and 7.

FIGS. 7 and 8 show said cleaning system 23 comprises scraper means 24 adapted to remove meat residue attached to the belt blade 5 during slicing action, and sprinkler means 25, adapted to wash the blade with a washing liquid to remove all dust.

In particular, said scraper means 24 and sprinkler means 25 are contained inside a collector receptacle 26 for the meat residue and the washing liquid, which is attached to the main body 3; and is crossed by the belt blade 5 in said lower section 51; said collector receptacle 26 being equipped with a waste duct 27 which protrudes from the exterior of the machine 1.

In order to use the machine 1, firstly the thickness of the meat slices required must be adjusted by setting the distance between the front support surface 9 and the cutting line 50, then the meat is introduced into the tubular containers 11.

Now the machine 1 can be activated, so that the pusher means 13 push the meat towards the exit opening 12 of each tubular container 11, and that the latter perform a backwards and forwards translation movement between the front and rear positions.

In this manner, when the tubular containers 11 are in the forward position, their exit opening 12 faces the relative front support surface 9, and the meat is pressed against the surface to define the thickness of the slice to be cut. Then, during the translation movement from front to rear position, the tubular container 11 moves the meat against the cutting line 50 of the belt blade 5, which cuts off a slice.

In particular, as can be seen in FIG. 5, in order to prevent the cutting line 50 from bending or torsion, the rear support surface 10 bears three guide elements 29 for the belt blade 5, two at the sides and one in the centre (see FIG. 1) which are positioned so that they do not interfere with the action of the tubular containers 11.

When the tubular containers 11 reach the rear position, their exit openings 12 face the rear support surface 10, which prevents the meat from moving downwards, thus, permitting the return run of the tubular containers 11. After it has been cut, the meat slice drops by gravity onto the upper moving surface 15 of the conveyor belt 14, which moves the slice away from the machine 1. In particular, said conveyor belt 14 is controlled by an electronic system adapted to regulate the running action in relation to the translation movement of the tubular containers 11, so that the meat slices are placed on the upper moving surface 15 according to an established order, suitable for specific packaging requirements, for example.

In order to increase productivity levels of the machine 1, the tubular containers 11 can operate individually, separate from one another, so that one can be loaded while the other is performing the slicing action, thus eliminating dead times during work operations.

Naturally numerous modifications of a practical nature can be applied to the subject invention while remaining within the context of the inventive concept as claimed below.

The invention claimed is:

1. A meat slicing machine, comprising a belt blade (5) adapted to follow a straight cutting line (50) for the meat to be sliced, comprising at least:
    a support surface (9) parallel to the cutting line (50) and set at a distance from said cutting line (50) in a direction perpendicular to the support surface (9) itself;
    a container (11) for the meat to be sliced, having an exit opening (12) facing said support surface (9) on one side of the cutting line (50);
    pushing means (13), associated with said container (11), for producing a force to push the meat vertically downwardly towards said exit opening (12); and
    a moving mechanism (19, 22) adapted to translate the container (11) in a parallel manner to the support surface (9) with a backward and forward motion from one side of the cutting line (50) to the other,
    wherein said machine further comprises a second support surface (10) adjacent to the other side of the cutting line (50) and substantially coplanar to the cutting line (50) and parallel to said support surface (9), and further wherein the cutting line (50) said support surface (9) and said second support surface are all horizontal.

2. The meat slicing machine according to claim 1, characterized in that said support surface (9) is mobile, so that it is able to vary the distance that separates it from said cutting line (50).

3. The meat slicing machine according to claim 1, characterized in that said container (11) comprises at least one portion (11') that can be opened, adapted to load the meat to be sliced.

4. The meat slicing machine according to claim 1, characterized in that it comprises a plurality of containers (11) each of which is associated with respective pusher means (13) and moving means (19, 22) so that each container is adapted to work independently of each other.

5. The meat slicing machine according to claim 4, characterized in that each container (11) is associated with a relative support surface (9).

6. The meat slicing machine according to claim 1, characterized in that said pusher means (13) comprise a disk (16), which slides inside the container (11).

7. The meat slicing machine according to claim 6, characterized in that said sliding disk (16) is moved by a jack (17), that is connected to the container (11) in such a manner that it moves integrally with it.

8. The meat slicing machine according to claim 1, characterized in that said frame (34) is connected to the structure of the machine (1) in such a manner, that it can be lowered to rest position to make the cutting area open to the user.

9. The meat slicing machine according to claim 1, characterized in that it comprises a safety system adapted to arrest, when any object is found inside the space (35) traveled by the container (11) during translation.

10. The meat slicing machine according to claim 9, characterized in that said safety system comprises at least two photocells (28) adapted to identify the presence of said object.

11. The meat slicing machine according to claim 1, characterized in that it comprises a moving surface (15) on which the sliced meat is placed after it is cut, to be conveyed away from the machine.

12. The meat slicing machine according to claim 11, characterized in that it comprises an electronic control system adapted to adjust the speed of said moving surface (15) in relation to the translation movement of the container (11).

13. The meat slicing machine according to claim 1, characterized in that it comprises a cleaning system (23) for the blade and belt (5).

14. The meat slicing machine according to claim 13, characterized in that said cleaning system (23) comprises scraper means (24) conceived to remove meat residue attached to the belt blade (5), and a sprinkler means (25) conceived to wash the belt blade with a washing liquid substance.

15. The meat slicing machine according to claim 14, characterized in that said scraper devices (24) and sprinkler device (25) are contained inside a collector receptacle (26) for meat residue and for the washing liquid, said receptacle being equipped with a waste pipe (27).

16. The meat slicing machine according to claim 1, characterized in that the belt blade (5) runs around two transmission rollers (6, 7) having an adjustable distance between centres to permit tension regulation of the blade (5).

\* \* \* \* \*

UNITED STATES PATENT AND TRADEMARK OFFICE
CERTIFICATE OF CORRECTION

| | | |
|---|---|---|
| PATENT NO. | : 7,658,135 B2 | Page 1 of 1 |
| APPLICATION NO. | : 11/493743 | |
| DATED | : February 9, 2010 | |
| INVENTOR(S) | : Giorgio Grasselli | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this

Thirtieth Day of November, 2010

David J. Kappos
*Director of the United States Patent and Trademark Office*